United States Patent
Kudo et al.

(10) Patent No.: US 7,995,311 B2
(45) Date of Patent: Aug. 9, 2011

(54) MAGNETIC SHIELD, MANUFACTURING METHOD THEREOF AND THIN FILM MAGNETIC HEAD EMPLOYING THE SAME

(75) Inventors: Kazue Kudo, Kanagawa (JP); Gen Oikawa, Kanagawa (JP); Yohji Maruyama, Saitama (JP); Noriyuki Saiki, Kanagawa (JP); Hiromi Shiina, Ibaraki (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 921 days.

(21) Appl. No.: 11/820,554

(22) Filed: Jun. 19, 2007

(65) Prior Publication Data
US 2008/0002308 A1 Jan. 3, 2008

(30) Foreign Application Priority Data
Jun. 19, 2006 (JP) ................................. 2006-168550

(51) Int. Cl.
*G11B 5/147* (2006.01)
(52) U.S. Cl. .................... 360/319; 360/125.12
(58) Field of Classification Search .................. 360/319, 360/125.03, 125.12, 125.5; 428/811.2, 811.5, 428/812, 815.2
See application file for complete search history.

(56) References Cited

U.S. PATENT DOCUMENTS

| | | | | |
|---|---|---|---|---|
| 6,132,892 A * | 10/2000 | Yoshikawa et al. | ............ | 428/812 |
| 6,296,955 B1 * | 10/2001 | Hossain et al. | ............ | 428/815.2 |
| 6,342,311 B1 * | 1/2002 | Inturi et al. | ................ | 428/815.2 |
| 6,541,065 B1 * | 4/2003 | Sasaki et al. | .................. | 427/130 |
| 6,723,449 B2 * | 4/2004 | Kudo et al. | ................ | 428/811.2 |
| 6,778,358 B1 * | 8/2004 | Jiang et al. | ................. | 360/125.5 |
| 7,057,853 B2 * | 6/2006 | Okada et al. | .............. | 360/125.12 |
| 7,220,499 B2 * | 5/2007 | Saito et al. | .................. | 428/811.5 |
| 7,426,091 B2 * | 9/2008 | Okada et al. | .............. | 360/125.03 |
| 7,522,377 B1 * | 4/2009 | Jiang et al. | ............... | 360/125.12 |
| 2001/0036043 A1 | 11/2001 | Oikawa et al. | | |
| 2006/0119982 A1 * | 6/2006 | Honjo et al. | ................... | 360/126 |

FOREIGN PATENT DOCUMENTS

| | | |
|---|---|---|
| JP | 2000-054083 | 2/2000 |
| JP | 2001-291211 | 10/2001 |
| JP | 2002-324303 | 11/2002 |
| JP | 2003-77723 | 3/2003 |
| JP | 2005-209244 | 8/2005 |

* cited by examiner

*Primary Examiner* — Angel A. Castro
(74) *Attorney, Agent, or Firm* — Daphne L. Burton; Burton IP Law Group

(57) ABSTRACT

Embodiments of the present invention provide a magnetic shield composed of size-controlled small crystal grains and provide a more after-write read noise free thin film magnetic head. According to one embodiment of the present invention, an upper magnetic shield uses a multi-layered magnetic film formed by alternately stacking a face-centered cubic (fcc) crystalline magnetic thin layer and a body-centered cubic (bcc) crystalline magnetic thin layer by plating. The plating bath is such that the temperature is 30±1° C., pH is about 2.0–1.0 to 2.0+0.5, metal ion concentrations are about 5 to 25 (g/l) for $Ni^{2+}$ and 5 to 15 (g/l) for $Fe^{2+}$, saccharin sodium concentration is about 1.5±1.0 (g/l), sodium chloride concentration is about 25±5 (g/l), and boric acid concentration is about 25±5 (g/l). Each layer's crystal structure is different from that of its upper and lower layers, which results in size-controlled small crystal grains since the epitaxial growth is broken. Since crystal grains are reduced in size, it is possible to suppress the after-write read noise and therefore attain a read head which allows recording at higher frequencies.

18 Claims, 6 Drawing Sheets

Fig. 2

| Ni²⁺(g/l) | 5～25 |
|---|---|
| Fe²⁺(g/l) | 5～15 |
| Sodium Saccharin(g/l) | 1.5±1.0 |
| Anode | Nickel(4N) |
| NaCl(g/l) | 25±5 |
| H₃BO₃(g/l) | 25±5 |
| Temperature(°C) | 30°±1° |
| pH | 2.0+0.5／−1.0 |

| | step1 | step2 | step3 | step4 | step5 | step6 | step7 | step8 |
|---|---|---|---|---|---|---|---|---|
| Current(mA) | 280 | 900 | 280 | 900 | 280 | 900 | 280 | 900 |
| time | 1' 30" | 0' 03" | 1' 30" | 0' 03" | 1' 30" | 0' 03" | 1' 30" | 0' 03" |

MAGNETIC SHIELD, MANUFACTURING METHOD THEREOF AND THIN FILM MAGNETIC HEAD EMPLOYING THE SAME

CROSS-REFERENCE TO RELATED APPLICATION

The instant nonprovisional patent application claims priority to Japanese Patent Application No. 2006-168550 filed Jun. 19, 2006 and incorporated by reference in its entirety herein for all purposes.

BACKGROUND OF THE INVENTION

Magnetic recording and reproducing apparatuses, represented by magnetic disk drives, have been required to provide higher data transfer rates and higher recording densities. Raising the data transfer rate requires a higher recording frequency, causing a tendency to increase after-write read noise. The term "after-write read noise" used herein means a phenomenon in which after data is recorded on the magnetic disk, noise is produced on the read output during the subsequent read operation. A conventional method for preventing the thin film magnetic head from outputting after-write noise, is to control the thickness and magnetic property, namely magnetostrictive coefficient λ of the upper magnetic shield disposed above the magnetic sensor film of the read head.

In Japanese Laid-Open Patent No. 2001-291211 ("Patent Document 1"), there is disclosed a thin film magnetic head in which the composition and magnetostrictive coefficient λ of the upper magnetic shield is controlled in its film thickness direction in order to reduce after-write read noise.

For magnetic disk drives to further advance in data transfer rate and recording density, it is necessary to suppress after-write read noise which tends to increase as the data transfer rate and recording density are raised. The magnetic shield is made of Permalloy (Ni80Fe20) and has large crystal grains of 50 nm or larger in diameter. After-write read noise is attributable to disturbance of the magnetic domain structure which depends on these crystal grains. In particular, it is considered that as the read track width approaches to 100 nm, contribution of the crystal grain size to such noise becomes significant, making it necessary to control the size of crystal grains constituting the magnetic shield film.

BRIEF SUMMARY OF THE INVENTION

Embodiments in accordance with the present invention provide a magnetic shield composed of size-controlled small crystal grains and provide a more after-write read noise free thin film magnetic head. As shown in the particular embodiment of FIG. 7, an upper magnetic shield 26 uses a multi-layered magnetic film formed by alternately stacking a face-centered cubic (fcc) crystalline magnetic thin layer and a body-centered cubic (bcc) crystalline magnetic thin layer by plating. The plating bath is such that the temperature is 30±1° C., pH is 2.0–1.0 to 2.0±0.5, metal ion concentrations are about 5 to 25 (g/l) for $Ni^{2+}$ and 5 to 15 (g/l) for $Fe^{2+}$, saccharin sodium concentration is about 1.5±1.0 (g/l), sodium chloride concentration is about 25±5 (g/l), and boric acid concentration is about 25±5 (g/l). Each layer's crystal structure is different from that of its upper and lower layers, which results in size-controlled small crystal grains since the epitaxial growth is broken. Since crystal grains are reduced in size, it is possible to suppress the after-write read noise and therefore attain a read head 20 which allows recording at higher frequencies.

BRIEF DESCRIPTION OF THE DRAWINGS

FIG. 2 shows the composition of a plating bath for forming a multi-layered magnetic film.

DETAILED DESCRIPTION OF THE INVENTION

Figure 1:
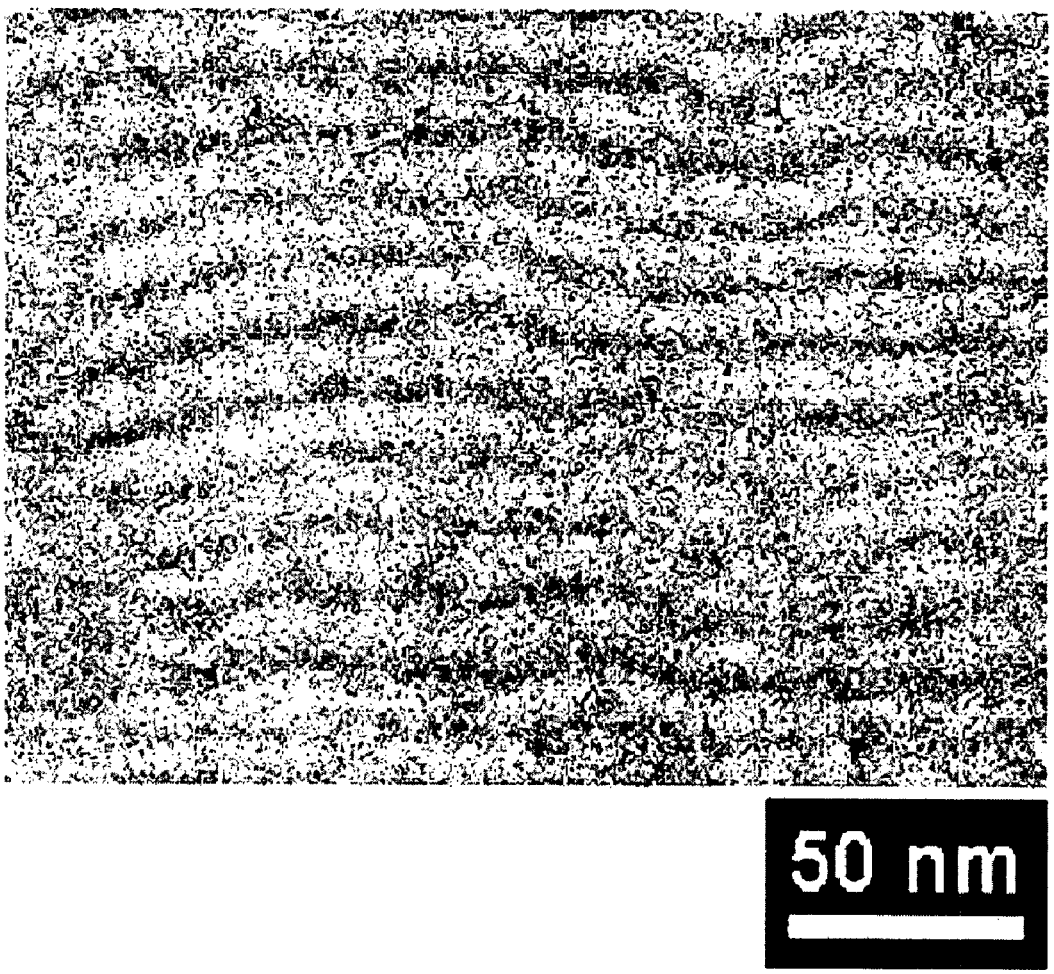
FIG. 1 is a TEM photograph of a section of a multi-layered magnetic film, a magnetic shield in accordance with a first embodiment of the present invention.

Embodiments in accordance with the present invention relate to magnetic shields and thin film magnetic heads using magnetic shields. More particularly, embodiments of the invention concern the structure and manufacturing method of a magnetic shield.

In consideration of the above-mentioned problem, an object of embodiments of the present invention to provide a magnetic shield composed of size-controlled small crystal grains.

It is a second object of embodiments of the present invention to provide a more after-write read noise free thin film magnetic head.

To achieve the above-mentioned first object, a magnetic shield according to embodiments of the present invention comprises a multi-layered magnetic film which is formed by alternately stacking a face-centered cubic crystalline magnetic plated thin layer and a body-centered cubic crystalline magnetic plated thin layer.

The thickness of the face-centered cubic crystalline magnetic plated thin layer may be larger than that of the body-centered cubic crystalline magnetic plated thin layer.

Both the face-centered cubic crystalline magnetic plated thin layer and the body-centered cubic crystalline magnetic plated thin layer may be 0.5 to 20 nm in thickness.

The total composition of the multi-layered magnetic film may satisfy 70≦Ni≦90 wt % and 10≦Fe≦30 wt %.

The composition of the face-centered cubic crystalline magnetic plated thin layer may satisfy 75≦Ni≦90 wt % and 10≦Fe≦25 wt % and the composition of the body-centered cubic crystalline magnetic plated thin layer may satisfy 15≦Ni≦25 wt % and 75≦Fe≦85 wt %.

A magnetic shield fabrication method according to an embodiment of the present invention comprises;
a first step of forming a magnetic thin layer by plating wherein the composition of the magnetic thin layer satisfies 75≦Ni≦90 wt % and 10≦Fe≦25 wt %; and a second step of forming a magnetic thin layer by plating wherein the composition of the magnetic thin layer satisfies 15≦Ni≦25 wt % and 75≦Fe≦85 wt %, wherein a magnetic shield comprising a multi-layered magnetic film is formed by alternately executing the first step and the second step.

The first step and the second step may be executed in such a plating bath that the temperature is 30±1° C., pH is 2.0–1.0 to 2.0+0.5, metal ion concentrations are 5 to 25 (g/l) for $Ni^{2+}$ and 5 to 15 (g/l) for $Fe^{2+}$, saccharin sodium concentration is 1.5±1.0 (g/l), sodium chloride concentration is 25±5 (g/l), and boric acid concentration is 25±5 (g/l).

To achieve the above-mentioned second object, a thin film magnetic head according to embodiments of the present invention comprises a lower magnetic shield, an upper magnetic shield and a read transducer which is formed between the lower magnetic shield and the upper magnetic shield via a lower gap film and an upper gap film, wherein one or both of the upper magnetic shield and the lower magnetic shield is or are formed by alternately stacking a face-centered cubic crystalline magnetic plated thin layer and a body-centered cubic crystalline magnetic plated thin layer.

According to embodiments of the present invention, it is possible to attain a magnetic shield composed of small crystal grains. As well, it is possible to attain a more after-write read noise free thin film magnetic head.

Figure 7:
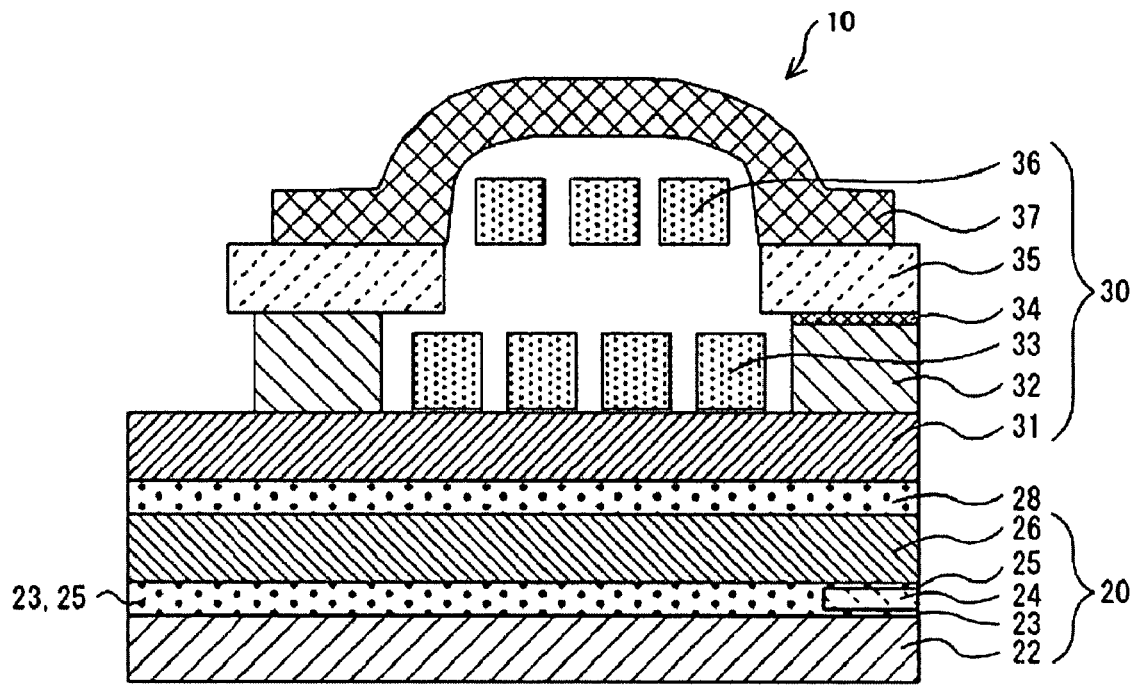
FIG. 7 shows a section of a read/write combination magnetic head having a read head in accordance with a second embodiment.

With reference to the drawings, the following will describe how a magnetic shield, a thin film magnetic reproducing head, longitudinal recording magnetic read/write head and perpendicular recording magnetic read/write head are configured and fabricated in accordance with embodiments of the present invention. Firstly, the configuration of a longitudinal recording magnetic read/write head 10, which has a thin film magnetic reproducing head 20 and a thin film magnetic recording head 30, is described below with reference to FIG. 7. Shown in FIG. 7 is a section of the head's transducer portion cut in the head's depth direction. The thin film magnetic reproducing head (hereinafter denoted simply as the read head) 20 comprises a lower magnetic shield 22 formed on a substrate not shown in the figure, an upper magnetic shield 26, and a read transducer 24 formed between the lower magnetic shield 22 and the upper magnetic shield 26 via a lower gap film 23 and an upper gap film 25. The read transducer 24 may be a MR (Magnetoresistive) sensor, a GMR (Great Magnetoresistive) sensor, a TMR (Tunneling Magnetoresistive) sensor or the like. The thin film magnetic recording head (hereinafter denoted simply as the write head) 30, which is an inductive magnetic head formed on the read head 20 via a dielectric separation film 28, comprises a lower magnetic core 31, a lower magnetic pole 32, a lower coil 33, a magnetic gap film 34, an upper magnetic pole 35, an upper coil 36 and an upper magnetic core 37.

To reduce after-write read noise which may occur depending on the size of crystal grains, the magnetic shields used in the read head 20 of the longitudinal recording magnetic read/write head 10, especially the upper magnetic shield 26, must be controlled so as to be composed of small crystal grains. In the embodiment described below, the upper magnetic shield 26 is formed by alternately depositing magnetic thin films having different crystal structures by plating. Each layer breaks the epitaxial growth from the lower layer, resulting in size-controlled small crystal grains.

The following describes fabrication of an embodiment of the magnetic shield film according to the present invention. On a prepared ceramic, glass or Si substrate of 5 inches in diameter, a double-layered film (Au/Cr=20/5 nm) film is formed by sputtering as a conductive foundation film for plating. Then, plating is done in a plating solution whose composition is shown in FIG. 2. The plating solution of FIG. 2 is such that the temperature is 30±1° C., metal ion concentrations are 5 to 25 (g/l) for Ni2+ and 5 to 15 (g/l) for Fe2+, saccharin sodium concentration is 1.5±1.0 (g/l), sodium chloride concentration is 25±5 (g/l), and boric acid concentration is 25±5 (g/l). In the plating tank, 250 l of the solution is used (N.sub.2 bubbling purge included). Preferably, the ratio of the Ni ion concentration to the Fe ion concentration is designed to be not smaller than 1.5 (Ni ions/Fe ions≧1.5). To suppress the growth of crystal grains, the pH must not be higher than 2.5. However, if the pH is lower than 1, the plating deposition efficiency is remarkably low since hydrogen-generating reactions are dominant.

A constant current power supply was used for supplying plating electricity. Using a personal computer, it is possible to program up to 14 plating steps which differ in time and current. The time can be set in seconds for DC current and in milliseconds for pulse current. The current can be set in mA. The magnetic field applied during plating was 1 kOe (80 kA/m). For film thickness/composition measurement, a fluorescent X-ray analyzer was used. For measurement of magnetic characteristics Hc, Hk and Bs, a thin film-use B-H tracer was used.

Figures 3, 4:
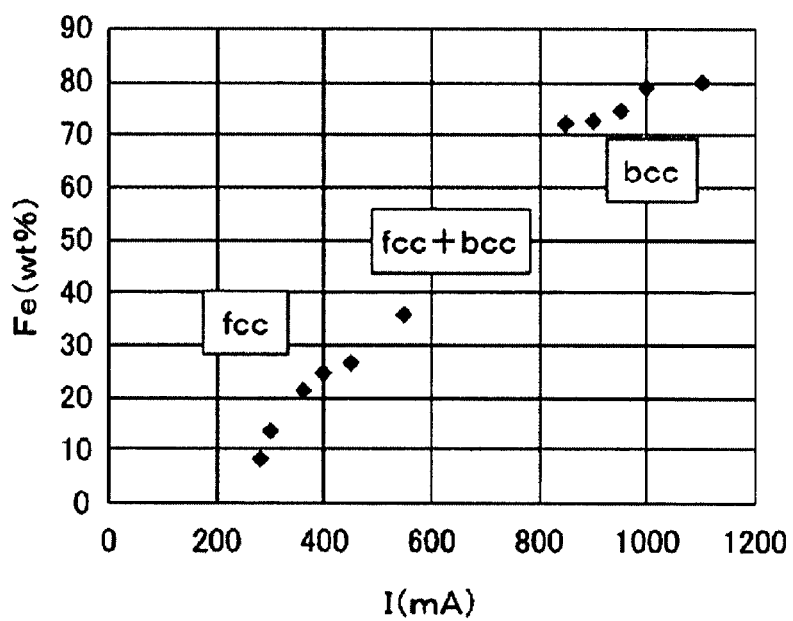
FIG. 3 is a current recipe for forming a multi-layered magnetic film.
FIG. 4 shows how the Fe content of a FeNi plated thin film formed by using the plating bath of FIG. 2 changes depending on the plating current.

FIG. 4 shows how the Fe content of a film deposited by using the plating bath of FIG. 2 changes depending on the plating current. As shown, a lower plating current results in a higher Ni content of the film while increasing the plating current almost linearly increases the Fe content of the film. The Ni or Fe content of the film formed in the plating bath of FIG. 2 can be changed between 5 and 90 wt % (5≦Ni≦90 wt %) or between 10 and 95 wt % (10≦Fe≦95 wt %) by changing the plating current. If their concentrations in the plating bath are not in their respective ranges shown in FIG. 2, the plated film can not be varied in composition so widely as shown in FIG. 4 by changing the plating current.

Figure 5:
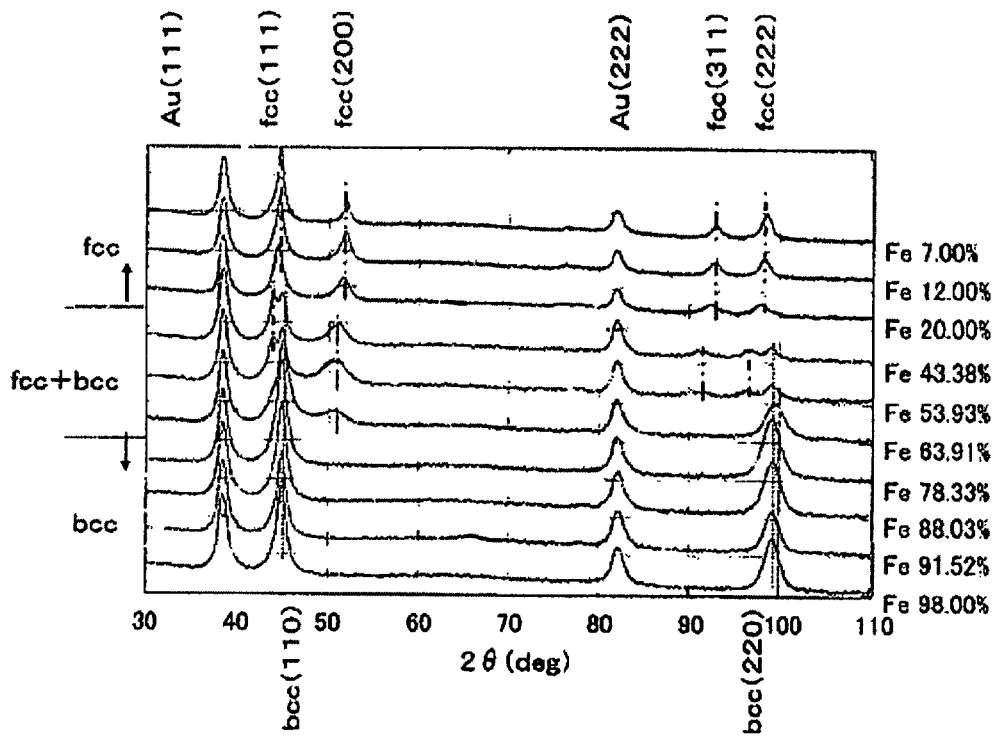
FIG. 5 shows X-ray diffraction patterns obtained from FeNi thin film formed by plating in the plating bath of FIG. 2.

Shown in FIG. 5 are X-ray diffraction patterns obtained from magnetic films fabricated under the above-mentioned conditions. As understood from this, if the Ni content of a magnetic film is high (Ni>70 wt %), the film's crystal structure is face-centered cubic (fcc) and if the Fe content is high (Fe>70 wt %), the crystal structure is body-centered cubic (bcc). If the composition is intermediary between them, the film contains both fcc and bcc structures.

A first embodiment is a magnetic shield comprising a multi-layered magnetic film formed by performing plating in the plating bath of FIG. 2 according to a current recipe shown in FIG. 3. Throughout the plating operation from the beginning to the end, the same plating tank was used. Note that time 1'30" in FIG. 3 means 1 minute and 30 seconds. In the recipe, each of plating steps 1, 3, 5 and 7 deposits a 15 nm thick magnetic plated thin layer whose composition is Ni88Fe12 wt %. Likewise, each of steps 2, 4, 6 and 8 deposits a 1.8 nm thick magnetic plated thin layer whose composition is Ni22Fe78 wt %. Steps 1 through 8 were sequentially repeated 30 times, forming a 504 nm thick multi-layered film whose total composition is Ni80.93Fe19.07 wt %. To make the magnetostrictive coefficient proper, this plated multi-layered film is mainly composed of Ni rich magnetic plated thin layers of the fcc crystal structure. Plated magnetic bcc crystalline thin layers are inserted in order to break the epitaxial growth. Preferably, each magnetic thin layer of the bcc crystal structure is not thinner than 0.5 nm to break the epitaxial growth.

Figure 6:
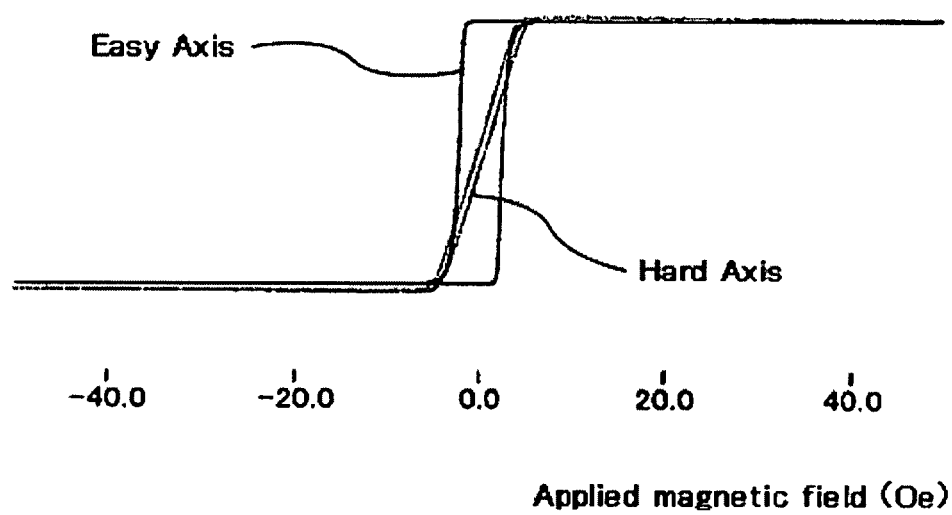
FIG. 6 shows B-H curves of a FeNi multi-layered magnetic thin film formed by plating in the plating bath of FIG. 2.

Shown in FIG. 6 are B-H curves of this magnetic film. This film's magnetic characteristics are such that Hch (coercive force along the hard axis) is 0.4 Oe (32 kA/m), Hce (coercive force along the easy axis) is 2.4 Oe (192 kA/m), Hk (anisotropy field) is 4.50 Oe (360 KA/m) and λ (magnetostrictive coefficient) is −9.0-7. Thus in magnetic characteristics, this film is substantially same as a single-layered Ni81Fe19 wt % Permalloy film.

By controlling the plating current/time as shown in FIG. 3, it is possible to fabricate a multi-layered magnetic film of which total Ni or Fe content ranges between 70 and 90 wt % (70≦Ni≦90 wt %) or between 10 and 30% (10≦Fe≦30 wt %). FIG. 1 shows a TEM photograph of a section of a plated film which was fabricated as mentioned above. Ni mapping is done on the TEM photograph. In FIG. 1, Ni rich layers look whitish while Fe rich layers look blackish. This result indicates the thickness of each magnetic plated thin layer can be controlled almost as desired.

The above-mentioned magnetic film is a multi-layered magnetic plated film fabricated by alternately stacking face-centered cubic (fcc) crystalline thin layers and body-centered cubic (bcc) crystalline thin layers. Since each thin layer differs in crystal structure from the adjacent thin layers, the epitaxial growth is broken, resulting in size-controlled small crystal grains which are not larger than the thickness of the layer.

By applying the above-mentioned multi-layered magnetic film to the upper magnetic shield which has great influence on the magnetic state of the read transducer, it is possible to reduce the noise which may occur depending on the sizes of crystal grains. Further, this effect can be enhanced by applying it to both upper and lower magnetic shields. As well, even if the film is applied to the lower magnetic shield, a noise reduction effect can be obtained although the effect is not so large as that obtained by application to the upper magnetic shield.

While the constituent layers of the multi-layered magnetic plated thin film are designed to have thicknesses 15 nm and 1.8 nm respectively in the above-mentioned embodiment, similar magnetic characteristics can be obtained if each face-centered cubic (fcc) crystalline layer is thicker than each body-centered cubic (bcc) crystalline layer although the thickness of each layer of either crystal structure must be in the range of 0.5 to 20 nm. In view of composition, similar magnetic characteristics can be obtained if the composition of each face-centered cubic crystalline layer is 75≦Ni≦90 wt % or 10≦Fe≦25 wt % and that of each body-centered cubic crystalline layer is 15≦Ni≦25 wt % or 75≦Fe≦85 wt %. In view of plating current, similar magnetic characteristics can be obtained if the plating current supplied to deposit each face-centered cubic crystalline layer is between 200 mA and 600 mA and that supplied to deposit each body-centered cubic crystalline layer is between 800 mA and 1200 mA. As well, it is not necessary to form the whole magnetic shield as a multi-layered film. That is, multi-layering or alternate stacking of face-centered cubic (fcc) and body-centered cubic (bcc) crystalline layers may be limited to the top, bottom or intermediary part of the magnetic shield.

Then, turning again to FIG. 7, the following describes the configuration of a read head in accordance with a second embodiment and how a longitudinal recording magnetic read/write head provided with this read head is configured. This description is made along the manufacture process. On the non-magnetic substrate (not shown in the figure), the lower magnetic shield 22 and lower gap film 23 are formed. On the lower gap film 23, a MR, GMR or TMR sensor is formed as the read transducer 24. At each side of the read transducer 24, a magnetic domain control layer and electrode film are formed although they are not shown in the figure. Then, after the upper gap film 25 is formed on the read transducer 24 and electrode films, the upper magnetic shield 26 is formed to complete the read head 20. This upper magnetic shield 26 is formed as follows. After the upper gap film 25 is formed, a 40-50 nm Ni80Fe20 wt % film is formed by sputtering as an underlayer for plating. A NiCr, Ta or other film of several nm may be formed as an adhesion layer before the underlayer is formed. On the underlayer, a resist pattern is formed in preparation for deposition of the upper magnetic shield 26. While cyclically changing the plating current according to the current recipe shown in FIG. 3, plating is done in the same plating bath. A multi-layered film is formed in the opening of the resist pattern.

Then, after the insulation film 28 is formed on the top of the read head 20, the lower magnetic core 31 is formed thereon by depositing a Ni46Fe54 wt % film by plating. After an alumina film is deposited on the Ni46Fe54 wt % film by sputtering, the lower magnetic core 31 is planarized by CMP. Then, a CoNiFe film of a predetermined thickness is formed as the lower magnetic pole 32 by depositing CoNiFe to a thickness of about 100 nm by sputtering and then extending the deposition by plating. Then, after an insulation film, lower coil 33, organic insulation film are formed, an alumina film is deposited by sputtering. Then, the lower magnetic pole 32 is planarized by CMP. Then, after the magnetic gap film 34 is deposited thereon, an underlayer film of about 100 nm is deposited by sputtering. Then, a resist frame is formed in preparation for deposition of the upper magnetic pole 35. A CoNiFe film and 46NiFe film are deposited in this order. Then, trimming process, such as ion milling, is performed to remove the resist and the unnecessary portions of the underlayer film and trim the upper magnetic pole 35 and lower magnetic pole 32 according to a predetermined track width. Then, after an alumina film is deposited by sputtering, the upper magnetic pole 35 is planarized by CMP and the upper coil 36 and organic insulation film are formed. Then, a Ni46Fe54 wt % film is deposited by plating as the upper magnetic core 37 to complete the write head 30.

Figure 8:
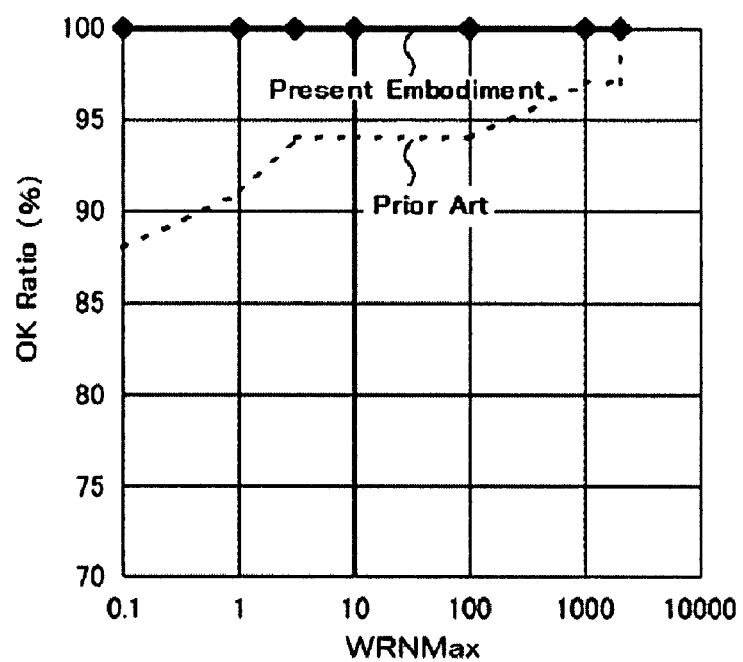
FIG. 8 concerns the after-write read noise from a read/write combination magnetic head having a read head in accordance with the second embodiment.

With longitudinal recording magnetic read/write heads 10 fabricated as described above and completed by forming the terminals, after-write read noise measurement was done. The result is shown in FIG. 8. The horizontal axis represents the maximum noise occurrence frequency (WRNMax) and the vertical axis represents the noise OK ratio. From read heads which comprises an upper magnetic field fabricated by a conventional method, after-write read noise was observed. In the case of the present read head embodiment, no after-write read noise was observed. This verified that the multi-layered magnetic film is effective to reduce the after-write read noise. It is therefore possible to obtain a read head and longitudinal recording magnetic read/write head which allow recording at high frequencies.

Conventional upper magnetic shields are made of Permalloy films having negative magnetostrictive coefficients. In the case of the present embodiment, although a multi-layered plated magnetic film (total composition: Ni73.61 Fe26.39wt %) which has a magnetostrictive coefficient λ of +14.7$^{-7}$ is used to form the upper magnetic shield, this configuration is verified to be effective to reduce the noise since crystal grains can be made smaller. This means that the permissible range of magnetostrictive coefficient λ is widened and therefore it is possible to manufacture a magnetic film improved in other magnetic characteristics.

Figure 9:
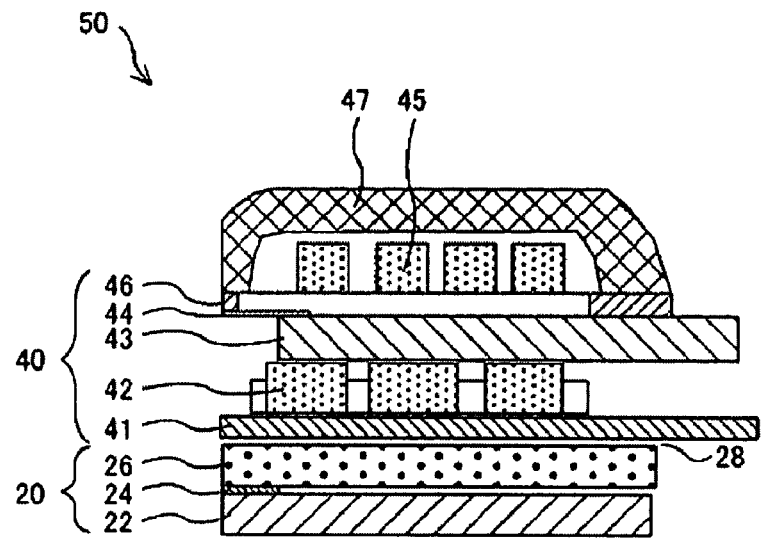
FIG. 9 shows a section of a perpendicular recording magnetic read/write head in accordance with a third embodiment.

As a third embodiment, FIG. 9 shows a perpendicular recording magnetic read write head 50 to which the above-mentioned multi-layered magnetic film is applied. A read head 20 has the same configuration as the above-mentioned second embodiment. A perpendicular recording head 40 comprises an auxiliary magnetic pole 41, lower coil 42, yoke 43 (whose rear portion is magnetically connected with the auxiliary magnetic pole 41), main magnetic pole 44 (at the front end of the yoke 43), upper coil 45, wraparound shield 46 and wraparound shield connecting section 47 which are formed on the read head 20 via an insulation film 28. As the upper magnetic shield 26 of the read head 20, a multi-layered magnetic film (total composition: Ni80.93Fe19.07 wt %) formed as described above is used. The auxiliary magnetic pole 41 is a Ni46Fe54 plated film. The yoke 43 is made of Ni80Fe20 Permalloy. The main magnetic pole 44 is a multi-layered film ((70FeCo/Cr=150 nm/3 nm)×20 layers)). Consequently, it is verified that the after-write read noise can be reduced without deterioration in overwrite performance (O/W) as compared with conventional perpendicular recording magnetic read/write heads. It is also verified that the same effect can be obtained by using the above-mentioned multi-layered film (total composition: Ni80.93Fe19.07 wt %) to form the yoke 43 and a single-layered plated film (FeCoNi, saturation flux density>2.4 T) to form the main magnetic pole 44.

Figure 10:
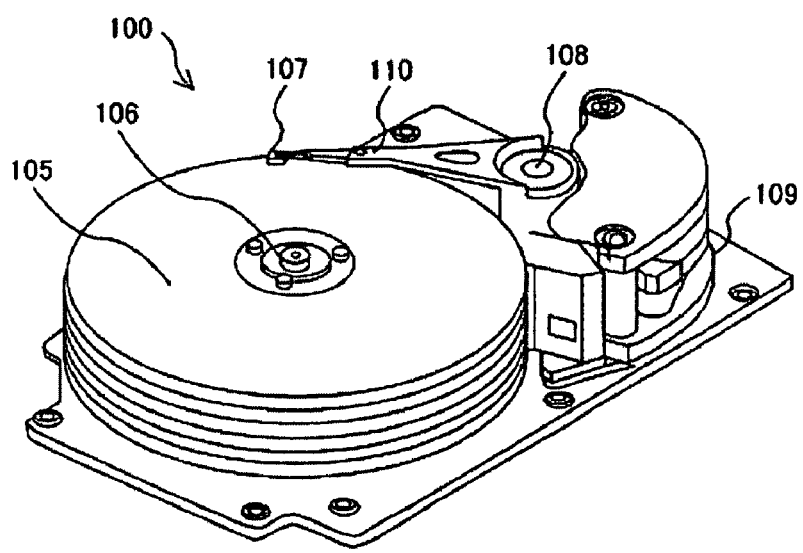
FIG. 10 schematically shows the configuration of a magnetic disk drive.

FIG. 10 schematically shows the configuration of a magnetic disk drive which employs the above-mentioned longitudinal or perpendicular recording magnetic read/write head. The magnetic disk drive 100 comprises magnetic disks 105 to record information thereon, a motor 106 to rotate the magnetic disks 105, thin film magnetic heads 107 to write and read information to and from the magnetic disks 105, suspensions 110 to carry the thin film magnetic heads 107 and an actuator 108 and voice coil motor 109 to move the thin film magnetic heads 107 to a target position on the magnetic disks 105 via the suspensions 110. Further, the magnetic disk drive 100 is provided with a magnetic disk rotation control circuit, head positioning control circuit and read/write signal processing circuit although they are not shown in the figure. As the thin film magnetic heads 107, longitudinal or perpendicular recording read/write heads in accordance with the above-mentioned embodiment are used.

Since this magnetic disk drive can remarkably reduce the after-write read noise, it is possible to raise the recording frequency and therefore allow higher data transfer rate.

What is claimed is:

1. A magnetic shield comprising a multi-layered magnetic film which is formed by alternately stacking a face-centered cubic crystalline magnetic plated thin layer and a body-centered cubic crystalline magnetic plated thin layer, wherein the composition of the face-centered cubic crystalline magnetic plated thin layer satisfies $75 \leq Ni \leq 90$ wt % and $10 \leq Fe \leq 25$ wt % and the composition of the body-centered cubic crystalline magnetic plated thin layer satisfies $15 \leq Ni \leq 25$ wt % and $75 \leq Fe \leq 85$ wt %.

2. The magnetic shield according to claim 1 wherein the thickness of the face-centered cubic crystalline magnetic plated thin layer is larger than the thickness of the body-centered cubic crystalline magnetic plated thin layer.

3. The magnetic shield according to claim 2 wherein both the face-centered cubic crystalline magnetic plated thin layer and the body-centered cubic crystalline magnetic plated thin layer are 0.5 to 20 nm in thickness.

4. The magnetic shield according to claim 1 wherein the multi-layered magnetic film formed by alternately stacking a face-centered cubic crystalline magnetic plated thin layer and a body-centered cubic crystalline magnetic plated thin layer has at least four layers in total.

5. The magnetic shield according to claim 1 wherein the total composition of the multi-layered magnetic film satisfies $70 \leq Ni \leq 90$ wt % and $10 \leq Fe \leq 30$ wt %.

6. A magnetic shield fabrication method comprising steps of: a first step of forming a magnetic thin layer by plating wherein the composition of the magnetic thin layer satisfies $75 \leq Ni \leq 90$ wt % and $10 \leq Fe \leq 25$ wt %; and a second step of forming a magnetic thin layer by plating wherein the composition of the magnetic thin layer satisfies $15 \leq Ni \leq 25$ wt % and $75 \leq Fe \leq 85$ wt %, wherein a magnetic shield comprising a multi-layered magnetic film is formed by alternately executing the first step and the second step.

7. The magnetic shield fabrication method according to claim 6 wherein the thickness of the magnetic plated thin layer formed by the first step is larger than the thickness of the magnetic plated thin layer formed by the second step.

8. The magnetic shield fabrication method according to claim 7 wherein the magnetic plate thin layer formed either by the first step or the second step is 0.5 to 20 nm in thickness.

9. The magnetic shield fabrication method according to claim 6 wherein the first step and the second step are executed in such a plating bath that the temperature is $30\pm1°$ C., pH is 2.0−1.0 to 2.0+0.5, metal ion concentrations are 5 to 25 (g/l) for Ni2+ and 5 to 15 (g/l) for Fe2+, saccharin sodium concentration is $1.5\pm1.0$ (g/l), sodium chloride concentration is $25\pm5$ (g/l), and boric acid concentration is $25\pm5$ (g/l).

10. The magnetic shield fabrication method according to claim 9 wherein the plating current in the first step is 200 mA to 600 mA, the plating current in the second step is 800 mA to 1200 mA and the plating time in the first step is set longer than the plating time in the second step.

11. A thin film magnetic head comprising a lower magnetic shield, an upper magnetic shield and a read transducer which is formed between the lower magnetic shield and the upper magnetic shield via a lower gap film and an upper gap film, wherein one or both of the upper magnetic shield and the lower magnetic shield is or are formed by alternately stacking a face-centered cubic crystalline magnetic plated thin layer and a body-centered cubic crystalline magnetic plated thin layer, wherein the composition of the face-centered cubic crystalline magnetic plated thin layer satisfies $75 \leq Ni \leq 90$ wt % and $10 \leq Fe \leq 25$ wt % and the composition of the body-centered cubic crystalline magnetic plated thin layer satisfies $15 \leq Ni \leq 25$ wt % and $75 \leq Fe \leq 85$ wt %.

12. The thin film magnetic head according to claim 11 wherein the thickness of the face-centered cubic crystalline magnetic plated thin layer is larger than the thickness of the body-centered cubic crystalline magnetic plated thin layer.

13. The thin film magnetic head according to claim 12 wherein both the face-centered cubic crystalline magnetic plated thin layer and the body-centered cubic crystalline magnetic plated thin layer are 0.5 to 20 nm in thickness.

14. The thin film magnetic head according to claim 11 wherein the multi-layered magnetic film formed by alternately stacking a face-centered cubic crystalline magnetic plated thin layer and a body-centered cubic crystalline magnetic plated thin layer has at least four layers in total.

15. The thin film magnetic head according to claim 11 wherein the total composition of the multi-layered magnetic film satisfies $70 \leq Ni \leq 90$ wt % and $10 \leq Fe \leq 30$ wt %.

16. The thin film magnetic head according to claim 11 wherein the thin film magnetic head further comprises a write head formed adjacent to the upper magnetic shield.

17. The thin film magnetic head according to claim 11 wherein the thin film magnetic head further comprises a perpendicular recording write head formed adjacent to the upper magnetic shield, the perpendicular recording write head having a main magnetic pole, a yoke for the main magnetic pole, and an auxiliary magnetic pole.

18. The thin film magnetic head according to claim 17 wherein the yoke for the perpendicular recording write head comprises a multi-layered magnetic film formed by alternately stacking a face-centered cubic crystalline magnetic plated thin layer and a body-centered cubic crystalline magnetic plated thin layer.

* * * * *